United States Patent

[11] 3,623,750

| [72] | Inventor | David M. Allen |
| | | Rte 1, Box 37, Bremen, Ky. 42325 |
| [21] | Appl. No. | 847,204 |
| [22] | Filed | Aug. 4, 1969 |
| [45] | Patented | Nov. 30, 1971 |

[54] TRAILER HITCH, NO SWAY TRAILER HITCH
2 Claims, 7 Drawing Figs.

[52] U.S. Cl. ............................................. 280/446 B
[51] Int. Cl. ............................................. B60d 7/00
[50] Field of Search ................................. 280/446 B,
446; 297/274; 188/102

[56] References Cited
UNITED STATES PATENTS
2,071,660  2/1937  Schultz et al. ............... 188/102
3,362,727  1/1968  Malherbe ...................... 280/446 B
3,379,456  4/1968  Bogie ............................ 280/446.3

FOREIGN PATENTS
672,977  3/1966  Belgium ......................... 280/446.2

Primary Examiner—Benjamin Hersh
Assistant Examiner—Robert R. Song

ABSTRACT: A trailer hitch having a three-point connection between a towing and towed vehicle, and which comprises spring-stretchable connections on opposite sides and a non-stretchable center connection; the side connections being attached at their rear ends to forwardly pivotable bars.

INVENTOR.
DAVID M. ALLEN

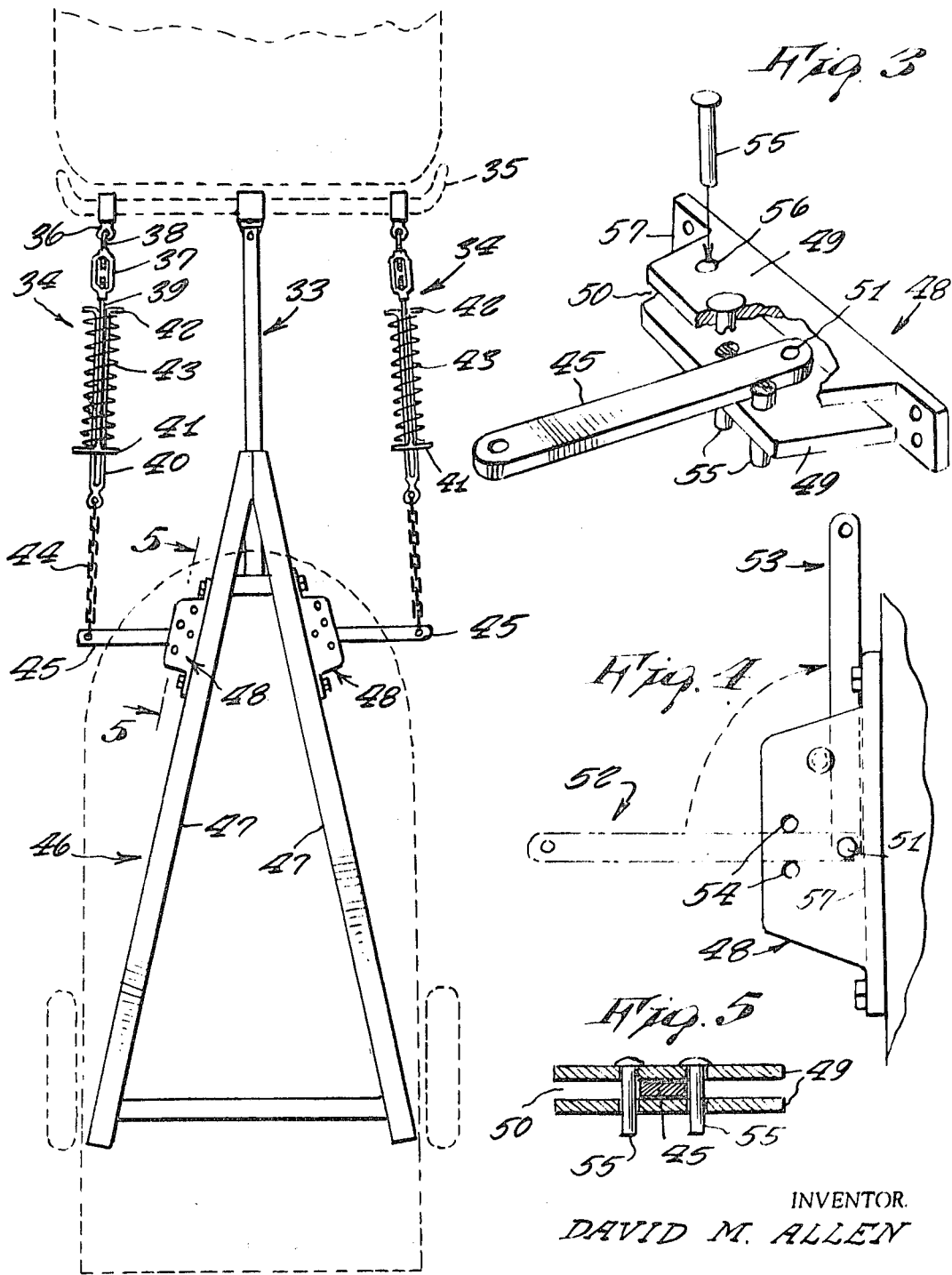

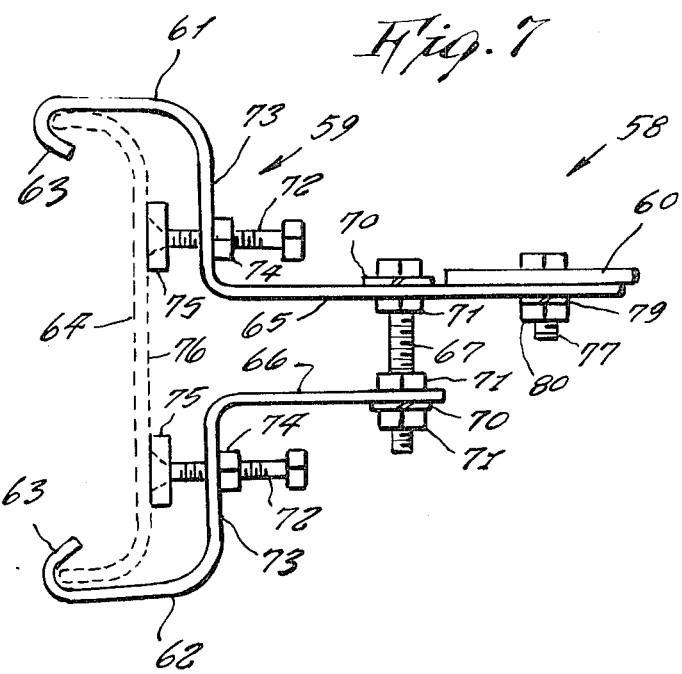
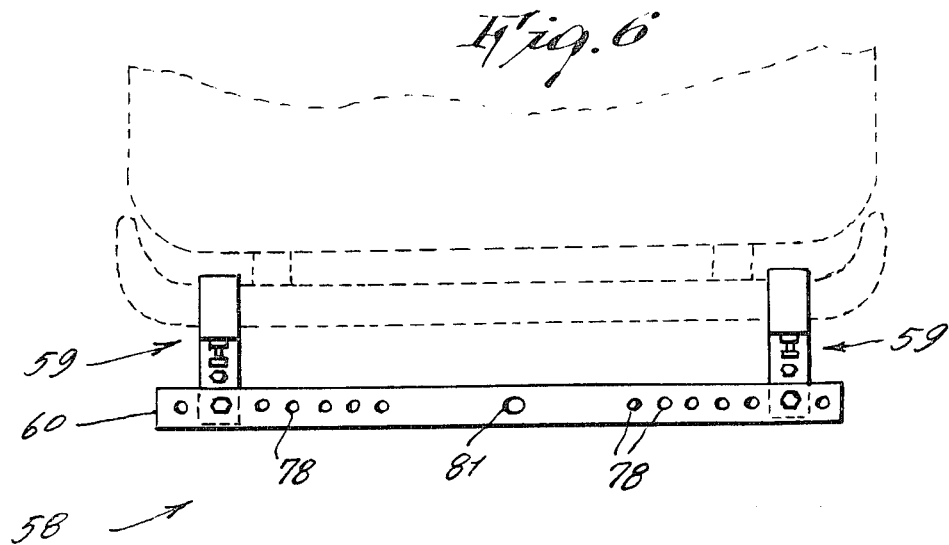

TRAILER HITCH, NO SWAY TRAILER HITCH

This invention relates generally to trailer hitches and more specifically to trailer hitches connectable between an automobile and a drawn vehicle.

One object of the present invention is to provide a trailer hitch having means to prevent sidesway of the trailer and which will enable the trailer to track around behind the towing vehicle prevent jackknifing of the trailer relative to the towing vehicle.

Another object of the present invention is to provide a trailer hitch having means to prevent sidesway of the trailer and wherein the hitch is attached to the towed vehicle as wide apart as possible.

Another object of the present invention is to provide a trailer hitch having means to make the towed vehicle follow the towing vehicle and remove the wheel drag out of the towed vehicle.

Still another object of the present invention is to provide a trailer hitch having a three-point pull and which is readily adjustable for accommodation to any trailer.

Other objects of the invention are to provide a trailer hitch bearing the above objects in mind which is of simple construction, has a minimum number of parts, is inexpensive to manufacture and efficient in operation.

For other objects and for a better understanding of the invention, reference may be had to the following detailed description taken in conjunction with the accompanying drawing, in which:

FIG. 2 is a plan view showing a modified form of the present invention:

FIG. 3 is a perspective view of a detail of the construction shown in FIG. 2:

FIG. 4 is a plan view thereof shown in an alternate position:

FIG. 5 is a cross-sectional view taken on the lines 5—5 of FIG. 2 and looking into the direction of the arrows thereof.

FIG. 6 is a plan view of an auxiliary accessory of the invention:

FIG. 7 is a side elevation view thereof shown enlarged.

Figure 1:
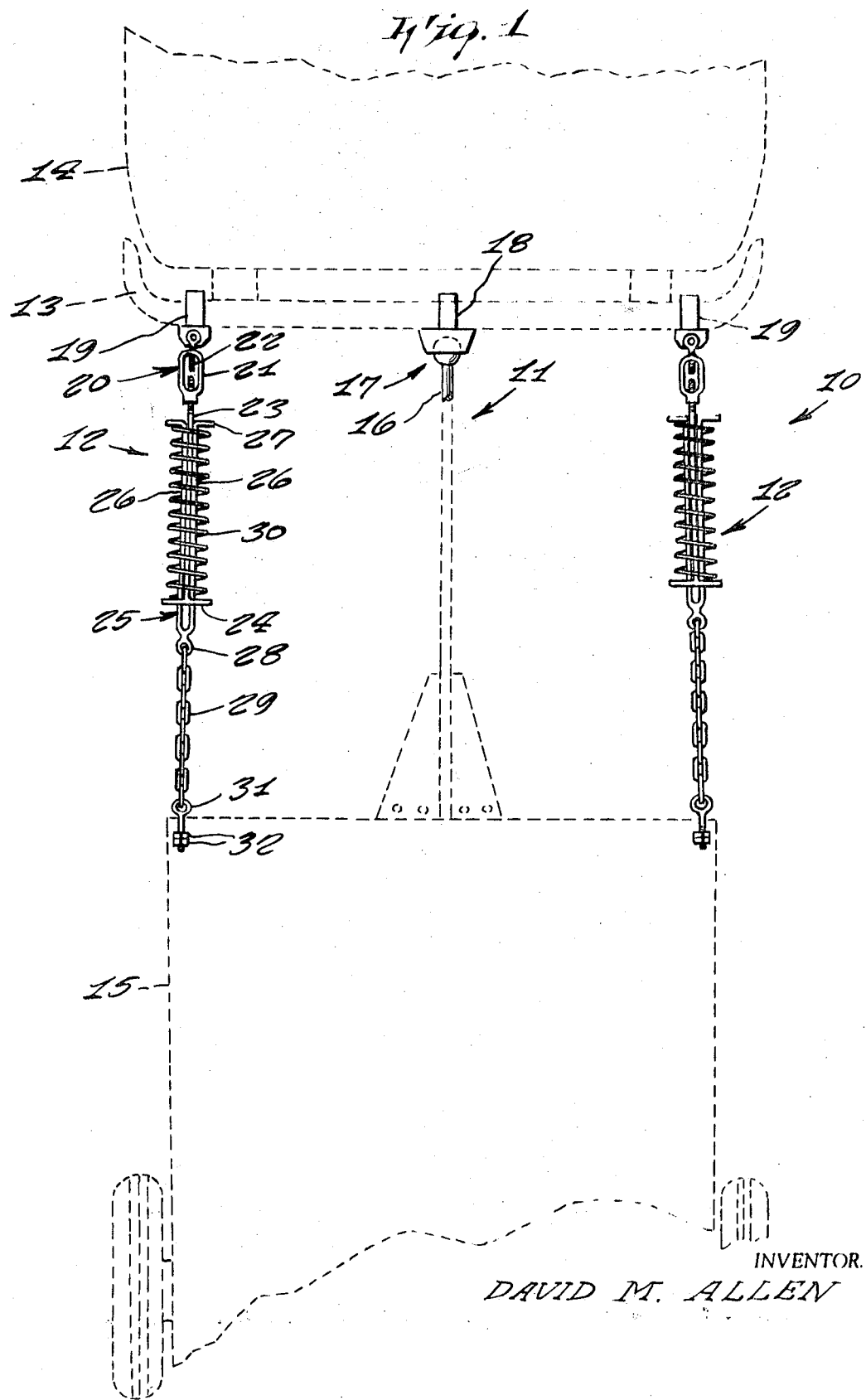
FIG. 1 is a top plan view of the invention shown in operative use between an automobile and a trailer.

Referring now to the drawing in detail, the numeral 10 represents a no-sway trailer hitch according to the present invention wherein there is a three-point pull obtained by means of a center unit 11 and a pair of end units 12. These units are attached at their forward ends to bumper 13 of automobile 14 at their rearward ends they are attached to the trailer or towed vehicle 15. The center unit is comprised of the trailer tongue 16 which is provided with a ball and socket unit 17 at forward end which is attached by any conventional clamp or the like 18 to the bumper. This ball and socket unit should be attached at the midpoint between the opposite extreme longitudinal ends of the bumper. Each of the end units is attached to the bumper by means of a universal clamp or eyebolt unit 19 and this attachment is made toward the outer ends of the bumper. Adjacent the universal clamp there is a turnbuckle element 20 comprised of a turnbuckle frame 21, threaded rod 22 and the threaded end of rod 23. The forward end of the rod 22 is attached by means of eyebolt or the like to the universal clamp and the threaded rod 23 extends rearwardly and relatively long length and has a crossbar 24 rigidly attached across its opposite end. This may be welded or affixed by any other permanent means. A bifurcated rod 25 extends longitudinally adjacent the rod 23 and is provided with legs 26 between which rod 23 is placed, Each of the legs has a foot 27 which is perpendicular to the leg. At its opposite end the rod has an eyelet 28 to which one end of a chain 29 is attached. A compression coil spring 30 is located around the rods 23 and 25 and is retained between the feet 27 of one rod and the crossbar 24 of the other rod. The opposite end of the chain is attached to an eyebolt 31 which is fastened to the trailer, the distance between the eyebolts being greater than the distance between the universal clamps 19. Thus, the point of attachment of the end units to the trailer is further apart than the point of attachment of the universal clamps. Accordingly, the end units thus taper convergingly in a forward direction. The eyebolt 31 is maintained in fixed position on the trailer by means of nuts 32 as shown in FIG. 1 of the drawing.

As is readily apparent, in operative use the coil spring in each of the end units will maintain a uniform pressure between the ends of the rods 23 and 25. The amount of compression in the coil spring can be readily adjusted to accommodate any trailer whether heavy or light, by simply turning the turnbuckle or changing the length of the chain. When installing the present mechanism the trailer should be turned sharply toward the right in order to hook up the right-hand end unit and then turned toward the left in the same manner to hook up the left-hand end unit. Then the spring force can be adjusted as described by means of the turnbuckle or chain. Due to the relatively wider apart attachment of the end units to the trailer and the relatively narrower apart attachment of the end units to the automobile there is a better towing quality. For example, as the towing vehicle turns toward the right the tension spring on the left side will increase the pull and the right spring will decrease it pull and this will cause the towed vehicle to follow the automobile more precisely and this will take the wheel drag out of the towed vehicle. Thus, due to the three-way pull the trailer will go on the course of the automobile when the latter turns, thus preventing sway.

A modified form of the construction is shown in FIGS. 2 to 5 inclusive wherein there is a center unit 33 and end units 34. The center unit is connected to the midpoint of the automobile bumper 35 in like manner as described above and each of the end units is comprised of like elements as also described above, including a universal clamp and eyebolt 36, turnbuckle 37, rode 38, 39 and 40, feet 42 and compression coil spring 43. Chains 44 are each attached at their rearmost end to retractable bars 45. As shown in FIG. 2 of the drawing, the trailer frame 46 is of generally triangular configuration having longitudinal forwardly converging beams 47. In the present construction there is a relatively long tongue such as are generally found on boat trailers and the like. A bracket 48 is bolted to each side of the trailer frame and the bracket has a pair of parallel sidewardly extending flanges 49 between which is a space 50. One end of the retractable bar 45 is pivotably attached by pin 51 within the space 50 to the flanges 49. Accordingly, the bar is free to rotate between a sidewardly extending position as shown at 52 in FIG. 4 and a forwardly extending position as shown at 53 in FIG. 4. A pair of openings 54 are provided in each of the flanges for the purpose of receiving pins 55 therethrough and which are for the use to maintain the bar in a fixed sidewardly outward position in which position the bars are attachable to the chains for operative use. When it is desired that the bars be retracted they are swung forwardly about pivot pin 51 as shown in FIG. 4. The bar is retained in such position by means of a pin 55 which is passed through openings 56 in each of the flanges thereby retaining the bar between the pin and the base 57 of the bracket. Thus, when the trailer hitch is not in use the bar can be readily stored out of the way in a secure manner.

In FIGS. 6 and 7, an accessory is shown that could be included as a component in the assembly of the above-described structure shown in FIGS. 2 to 5, and which is designed so to be readily attachable to any type and all sizes of bumpers, and wherein the hitch additionally incorporates a pair of universal bumper units 59 and a crossbar 60 supported therebetween, the crossbar serving to retain the hitch structure shown in FIG. 2, and to which the clamp 18 and the eyebolt units 19 may be attached.

The bumper units 59 each is comprised of an upper bracket 61 and lower bracket 62, each having a hook 63 at one end for champing around an edge of the vehicle bumper 64, the opposite ends of the brackets having parallel portions 64 and 66 respectively which are secured together by: a bolt 67, lockwasher 70, and nuts 71. A leveling screw 72 is threadingly attached to a vertical portion 73 of each bracket and locked in selected position by locknut 74, the screw having a swivel head 75 that bears against the outer side 76 of the bumper. The crossbar 60 is placed upon portion 66 of bracket 61 and is secured by a bolt 77 placed selectively through one of the openings 78 in the crossbar, the bolt being secured by a lockwasher 79 and nut 80. Other of the openings 78 and an opening 81 serve to secure the hitch 10 thereto.

While various changes may be made in the detail construction it shall be understood that such changes shall be within the spirit and scope of the present invention as defined by the appended claims.

What I claim as new and desired to protect by Letters Patent of the United States is:

1. In a trailer hitch, the combination of a plurality of units having means to exert a three-point pull between an automotive vehicle and a trailer, one of said units comprising a center unit and the other of said units comprising end units, said end units being adjustable in length and each of said units having adjustable longitudinal tension therein, said center unit being comprised having a ball and socket joined at a forward end of a trailer tongue, said ball being integrally attached to the forward end of said tongue, said socket having clamp means for attachment to an automobile bumper, said end units being attached between said automobile and said trailer with a forward ends of the end unit being relatively closer and the rearward ends of the end units being relatively further apart, each of said end units comprising a universal clamp and eyebolt at its forward end attachable to an automobile bumper, a turnbuckle element rearwardly adjacent said universal clamp, said turnbuckle comprising a threaded rod at each end threadingly engaged to a turnbuckle frame, the rearwardly extending rod having a crossbar at its rear most end and a bifurcated rod adjacent the last said rod, said bifurcated rod comprising a pair of legs, each of said legs having a foot at its forward end, said foot being perpendicular to said leg, a compression coil spring around said bifurcated rod and last said turnbuckle rod, said compression coil spring being retained longitudinally between said feet and said crossrod an eyelet at the rear most end of said bifurcated rod, and a chain connected at its forward end to said eyebolt and connected at its rear most end to said trailer, said end unit further including a bracket mountable to one side of said trailer frame, said bracket comprising a face and a pair of parallel sidewardly extending flanges in spaced-apart relation, a bar between said flanges, said bar being pivotable between a sidewardly extended position to a forwardly extending position, and a plurality of openings in each of said flanges to receive pins there through to maintain said bar in either of said position.

2. In a trailer hitch, the combination as set forth in claim 1 wherein said hitch includes a pair of universal bumper clamp units and a crossbar mounted upon said units, said hitch being secured to said crossbar: said clamp unit each comprising an upper and lower clamp, each clamp having a hook at one end for grasping around an edge of said bumper, each clamp including a vertical portion adjacent a horizontal opposite end portion, said end portions being secured together by bolt means, each vertical portion receiving a leveling screw which bears against an outer vertical side of said bumper, and one of said horizontal opposite ends having one end of said crossbar secured thereto by bolt means, and said crossbar comprising a flat bar having a plurality of openings therethrough for selectively being used for attachment thereof to said clamp units and attachment of said hitch thereto.

* * * * *